(12) United States Patent
Dietz et al.

(10) Patent No.: US 12,219,952 B1
(45) Date of Patent: Feb. 11, 2025

(54) MULTI DIMENSIONAL DECOY BODY AND HEAD CONNECTOR

(71) Applicants: Benjamin Dietz, Elko New Market, MN (US); Paul Dietz, Elko New Market, MN (US)

(72) Inventors: Benjamin Dietz, Elko New Market, MN (US); Paul Dietz, Elko New Market, MN (US)

( * ) Notice: Subject to any disclaimer, the term of this patent is extended or adjusted under 35 U.S.C. 154(b) by 428 days.

(21) Appl. No.: 16/664,852

(22) Filed: Oct. 26, 2019

(51) Int. Cl.
*A01M 31/06* (2006.01)
*F16B 1/00* (2006.01)

(52) U.S. Cl.
CPC .............. *A01M 31/06* (2013.01); *F16B 1/00* (2013.01); *F16B 2200/83* (2023.08)

(58) Field of Classification Search
CPC ..................... A01M 31/06; F16B 2201/0035
See application file for complete search history.

(56) References Cited

U.S. PATENT DOCUMENTS

| | | | |
|---|---|---|---|
| 4,339,887 A | 7/1982 | Streeter | |
| 4,885,861 A | 12/1989 | Gazalski | |
| 4,893,428 A | 1/1990 | Gagnon | |
| 4,965,953 A * | 10/1990 | McKinney | A01M 31/06 43/2 |
| 5,136,800 A | 8/1992 | Lanius | |
| 5,392,554 A | 2/1995 | Farstad et al. | |
| 5,570,531 A | 11/1996 | Sroka | |
| 5,964,055 A | 10/1999 | Smith | |
| 6,092,322 A | 7/2000 | Samaras | |
| 6,560,912 B1 | 5/2003 | Achepohl | |
| 6,647,657 B2 | 11/2003 | Igo | |
| 7,493,723 B2 | 2/2009 | Hess | |
| 7,568,305 B2 | 8/2009 | Fanfelle | |
| 7,716,866 B2 | 5/2010 | Zink et al. | |
| 8,082,690 B2 | 12/2011 | Zink | |
| 8,959,826 B2 | 2/2015 | Dean et al. | |
| 9,084,716 B1 | 7/2015 | Bawden | |
| 9,101,129 B2 | 8/2015 | Brooks | |
| 9,221,397 B1 * | 12/2015 | Kim | B60R 1/076 |
| 9,265,245 B2 | 2/2016 | Marsh | |
| 9,386,765 B1 | 7/2016 | Chatelain et al. | |
| 9,482,252 B2 | 11/2016 | Olien | |
| 2004/0211106 A1 | 10/2004 | Solomon | |
| 2005/0252066 A1 * | 11/2005 | Couvillion, III | A01M 31/06 43/3 |
| 2007/0099469 A1 * | 5/2007 | Sorensen | A45F 5/02 439/289 |
| 2007/0180754 A1 | 8/2007 | Neeley et al. | |
| 2007/0266613 A1 | 11/2007 | Nelson | |
| 2008/0163538 A1 * | 7/2008 | Butz | A01M 31/06 43/3 |
| 2009/0007479 A1 * | 1/2009 | Jerome, Sr. | A01M 31/06 248/156 |

(Continued)

*Primary Examiner* — Michael H Wang
(74) *Attorney, Agent, or Firm* — Dietz Law Office LLC

(57) ABSTRACT

An apparatus and method is described for providing three-dimensional decoys having removeable or interchangeable body parts. The decoy includes an interchangeable head having a connecting system that quickly interlocks the head to the decoy body without the need for rotation or snap fit. Further, the connecting system engages the head to the body with enough resistance that the decoy may be lifted by holding the head without disengaging from the body.

20 Claims, 19 Drawing Sheets

(56) References Cited

U.S. PATENT DOCUMENTS

| | | | |
|---|---|---|---|
| 2013/0078855 A1* | 3/2013 | Hornick | H01F 7/0205 |
| | | | 439/571 |
| 2014/0237885 A1* | 8/2014 | Brooks | A01M 31/06 |
| | | | 43/2 |
| 2014/0338249 A1 | 11/2014 | Heiges | |
| 2015/0040460 A1 | 2/2015 | Jones et al. | |
| 2015/0173347 A1* | 6/2015 | Lawton, Jr. | A01M 31/06 |
| | | | 43/3 |
| 2015/0208640 A1* | 7/2015 | Marsh | A01M 31/06 |
| | | | 43/3 |
| 2016/0309703 A1* | 10/2016 | Meyers | A01M 31/06 |
| 2016/0324142 A1 | 11/2016 | Stirling | |
| 2017/0332620 A1* | 11/2017 | Noe | G06F 13/4077 |
| 2018/0213770 A1* | 8/2018 | Davis | A01M 31/06 |
| 2019/0069536 A1* | 3/2019 | Davis | A01M 31/06 |

\* cited by examiner

MULTI DIMENSIONAL DECOY BODY AND HEAD CONNECTOR

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention relates generally to wildlife decoys used to attract wildlife. More particularly, the invention pertains to three-dimensional decoys having removeable or interchangeable body parts. The present invention includes interchangeable heads having a connecting system that quickly interlocks the head to the decoy body without the need for rotation or snap fit. Further, the interlock of the invention engages the head to the body with enough resistance that the decoy may be lifted by holding the head without the body disengaging and falling off, yet the interlock quickly releases when desired.

BACKGROUND

Over the years different animal attractants and decoy systems have been devised in an attempt to create the appearance of a desirable surroundings. Oftentimes, many decoys are used to create the appearance that a large flock or herd is utilizing the surroundings. Silhouettes, socks, full body, shells, inflatables, spinners, and other mechanical decoys have been devised to attract animals into the hunter's surroundings. In the past, cumbersome decoy systems have required additional time to set up and place the decoys in the water or fields. Frequently, the decoys are placed in the field or water in low light conditions and during extreme inclement weather. Heads having a variety of positions and moving parts have been incorporated into decoys to increase the realism of the decoy spread. However, additional set up time is required when handling these decoys. Especially during severe weather conditions with snow and ice present, decoys that require minimal time to set up and place in a desired location are preferred.

Additionally, although flocking and intricate detailing on decoys increases the realism of each decoy, special care and handling are required to avoid scratching or scuffing the surface of these decoys. When picking up and handling decoys it is natural to use the decoy head as a handle to carry the decoy. Many decoys have removable heads to reduce the amount the heads are handled and to reduce space requirements when storing the decoys. Prior decoy systems have been described that attempt to create a removeable head that may be installed and removed. However, typical head attachments essentially require a twisting and screwing the head onto the body, a localized and directed force to snap the head into engagement with the body, or a pushing and twisting of the head against the body to secure the head to the body. These attachment mechanisms are all difficult to execute while wearing heavy gloves or mittens and tend to scuff the flocking and paint from the heads. Also, during freezing temperatures, the heads and attachment mechanisms have a tendency to crack or break when subject to forces or torques. No known prior device describes an interlock between the head and body of a decoy capable of supporting the weight of the decoy body when lifting with the head and that disengages without requiring unsnapping or twisting forces. Also, no known prior device describes an interlock suitable for retrofitting to existing decoy heads and bodies.

SUMMARY

Embodiments according to aspects of the invention include an interlock for attaching a decoy head to the body. The decoy head and body may be made from a durable polymer, rubber or other material using known manufacturing techniques including roto molding, plastic injection molding, blow molding or other methods to form the decoy head and body in the preferred shape having the interconnect of the invention. Further, the interconnect or interlock may be manufactured using these techniques and may be incorporated or retrofitted into an existing decoy head and body.

The interlock of the present invention simply connects the head firmly to the body of a decoy without requiring force, twisting and other complex mechanical fasteners that tend to fail during inclement weather. The interlock of the invention may be incorporated into existing decoy head and bodies to eliminate the complex fastener or may be utilized to create a decoy having a simple interconnect between the body and removeable extremity portions. The decoy includes a body having a receptacle and a removeable extremity that has a base. The receptacle of the body has an open end, inward tapered side walls extending into the body from the open end, and the sidewall terminates at a bottom portion within the body. The sidewall has a first diameter adjacent the open end that is greater than a second diameter adjacent the bottom portion. The bottom portion includes a first magnet contained by the bottom portion. The base portion of the removable extremity interconnects with the body. The base portion includes an outwardly extending tapered projection terminating in an end. The tapered projection is sized to fit within the receptacle of the body and the end includes a second magnet contained by the end. The first and second magnets are oriented with reverse poles so that the magnets are drawn towards each other. The magnetic force holds the body and extremity together without the need for mechanical interlocks. Those skilled in the art will appreciate that a metal may be used as a substitute for one of the magnets. However, use of a magnet in both the body and extremity is preferred.

Alternatively, according to aspects of the invention, the first magnet may be embedded or fully enclosed within the bottom portion of the receptacle. Further, the second magnet may likewise be enclosed within the end of the base portion of the projection. The magnets may be embedded and remain operable in cold, heat, swamp water, dirt, grime and other extreme environments. A hollow enclosed cavity may be formed within the bottom portion of the receptacle, and the cavity may be isolated from ambient air. Further, a cavity may be formed in the end of the base portion, wherein the cavity is isolated from ambient air. Those skilled in the art will appreciate that other structures may be utilized to incorporate magnets into the receptacle and base without departing from the scope of the invention.

In an embodiment of the invention, the decoy includes a body having a receptacle and a head having a base, wherein the base interlocks with the receptacle. The receptacle has an open end, inward tapered side walls extending into the body from the open end, and terminates at an enclosed bottom portion within the body. The sidewall has a first diameter adjacent to the open end that is greater than a second diameter adjacent to the enclosed bottom portion. Also, the enclosed bottom portion includes a first magnet embedded in the enclosed bottom portion. The base portion interconnects with the body. The base portion includes an outwardly extending tapered projection terminating in an enclosed end. The tapered projection is sized to fit within the receptacle of the body. Also, the enclosed end includes a second magnet embedded in the enclosed end. The first and second magnets are oriented such that they provide an attracting and retaining force between the receptacle and protrusion.

Alternatively, without departing from the scope of the invention, the enclosed bottom may include a hollow enclosed cavity formed within the bottom portion of the receptacle. The magnet is embedded within the hollow enclosed cavity. Further, a cavity may be formed in the enclosed end of the projection, wherein the cavity is isolated from ambient air. The second magnet may be embedded in the cavity formed in the enclosed end of the projection.

Also described herein is an apparatus to interconnect a body and removable extremity portions of a decoy. The apparatus includes a first connector having a receptacle that may be attached to either the head or body of a decoy. The apparatus further includes a second connector having a base portion that mates with the first connector and may similarly be incorporated into the body or head of the decoy. The receptacle of the first connector includes an open end, inward tapered side walls extending into the first connector from the open end, and a terminating bottom portion within the first connector. The sidewall has a first diameter adjacent to the open end that is greater than a second diameter adjacent to the bottom portion. Further, the bottom portion includes a first magnet contained by the bottom portion. The second connector has a base portion that interconnects with the first connector. The base portion includes an outwardly extending tapered projection terminating in an end. The tapered projection is sized to fit within the receptacle of the first connector. Also, the end of the projection includes a second magnet contained by the end.

Additionally, the first magnet may be enclosed within the bottom portion of the receptacle, and the second magnet is enclosed within the end of the projection of the base portion. A hollow enclosed cavity may be formed within the bottom portion of the receptacle in which the magnet is contained. Likewise, a cavity may be formed in the end of the base portion, wherein the second magnet may be contained within the cavity. The cavities may be isolated from ambient air to further reduce the effects of extreme conditions to which decoys are subjected.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

The following description provides detail of various embodiments of the invention, one or more examples of which are set forth below. Each of these embodiments are provided by way of explanation of the invention and not intended to be an undue limitation of the invention. Further, those skilled in the art will appreciate that various modifications and variations may be made in the present invention without departing from the scope or spirit of the invention. By way of example, those skilled in the art will recognize that features illustrated or described as part of one embodiment may be used in another embodiment to yield a still further embodiment. Thus, it is intended that the present invention also cover such modifications and variations that come within the scope of the appended claims and their equivalents.

The apparatus for interconnecting the body portion and extremity portion of a decoy of the present invention generally includes an interconnecting base and an interconnecting receptacle. The interlock of the present invention is particularly well suited for interconnecting the head or feet of a waterfowl decoy to the body of the decoy. The base and receptacle cooperate together to create interlocks that are drawn together with sufficient force to allow a user to carry the decoy by the head without having the head fall off the body. Decoys may be manufactured utilizing the interconnect of the present invention. However, the interconnect of the present invention may also be used advantageously to retrofit existing decoys with a simple to use and efficient system. The interlock may further include rims extending from the base and receptacle that may be contoured to match the contour of existing decoy bodies or extremities.

Figure 1:
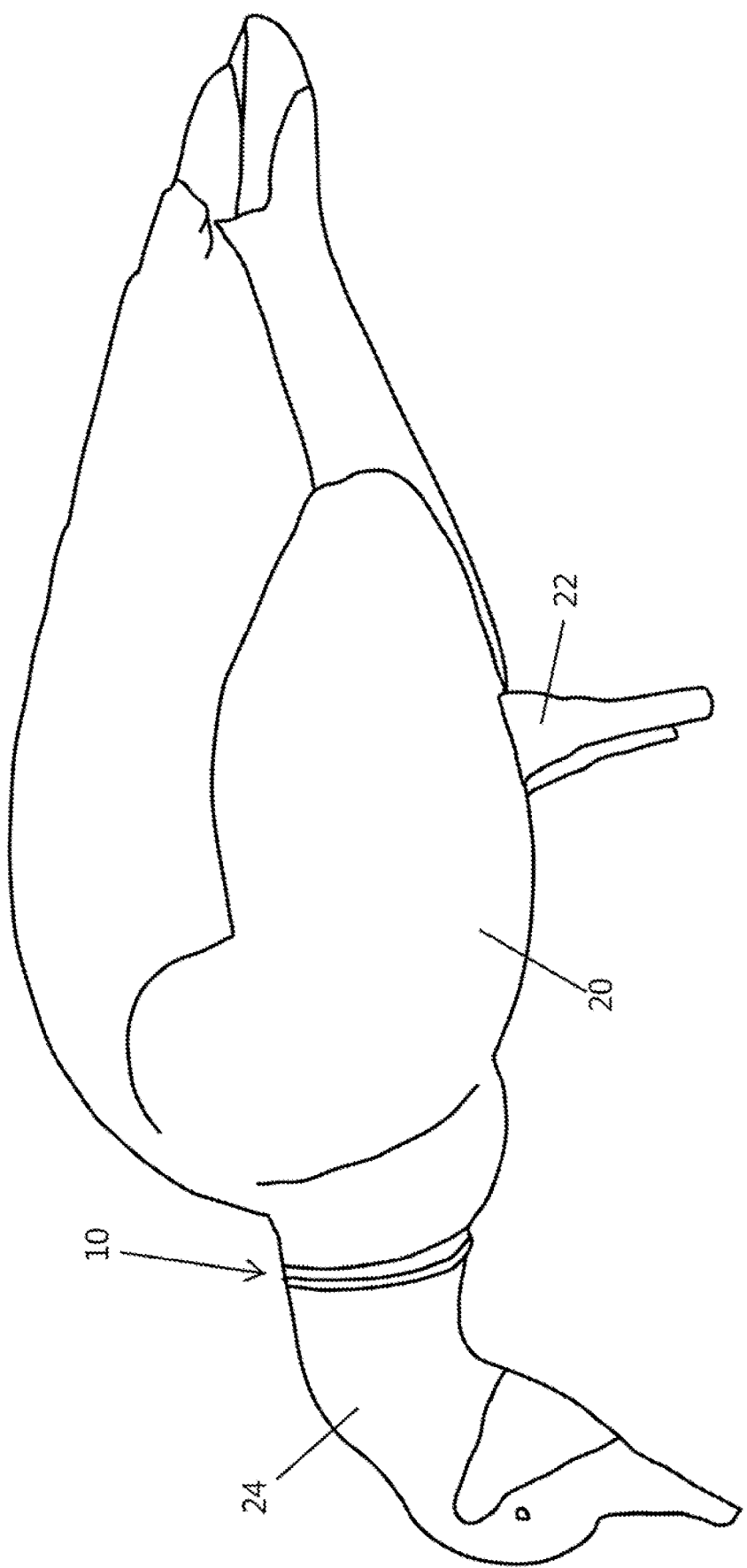
FIG. 1 is a perspective view of an interlock in accordance with an embodiment of the invention connecting the head and body of a field goose decoy.
Figure 2:
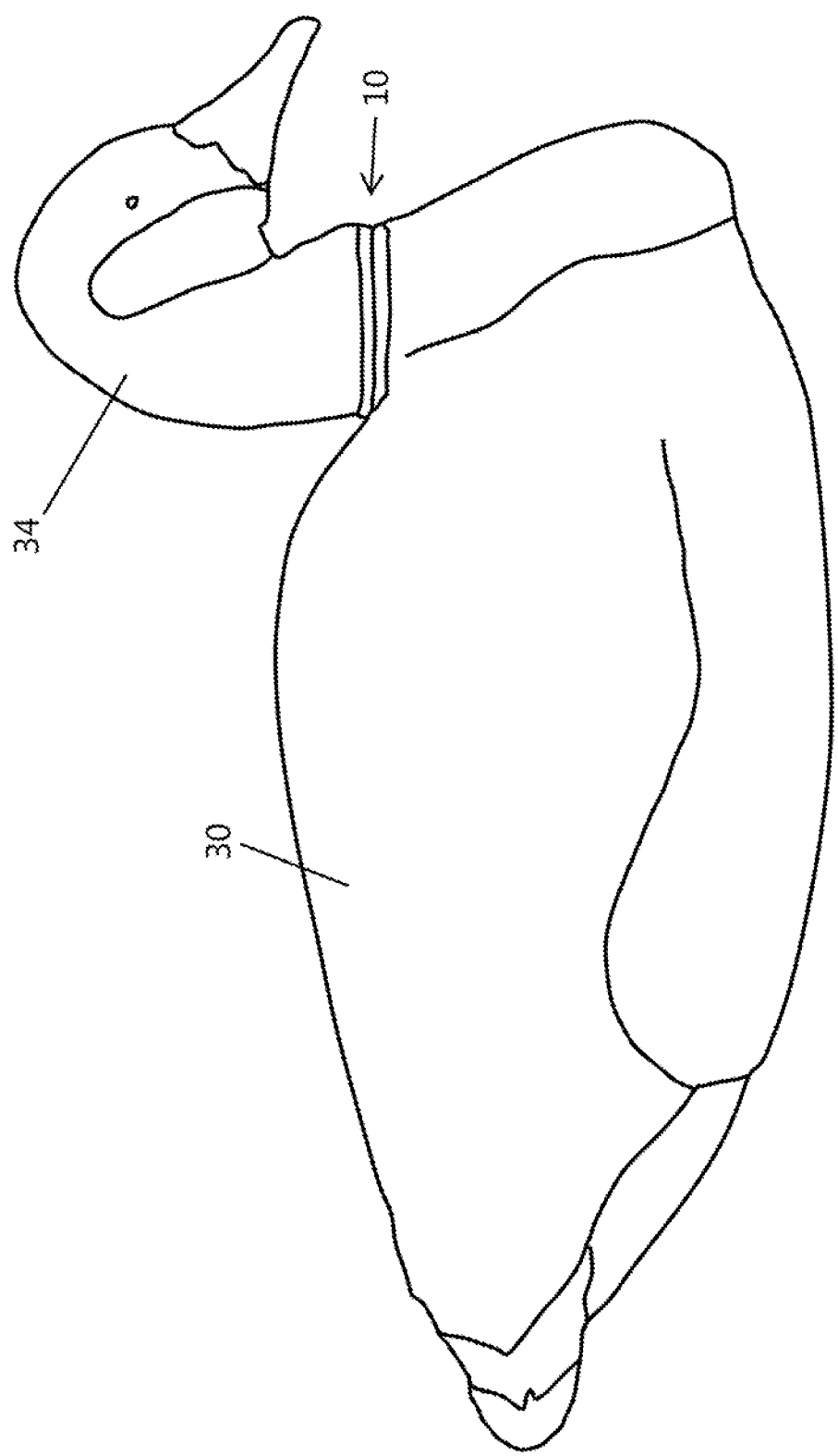
FIG. 2 is a perspective view of an interlock in accordance with an embodiment of the invention connecting the head and body of a floating water goose decoy.
Figure 3:
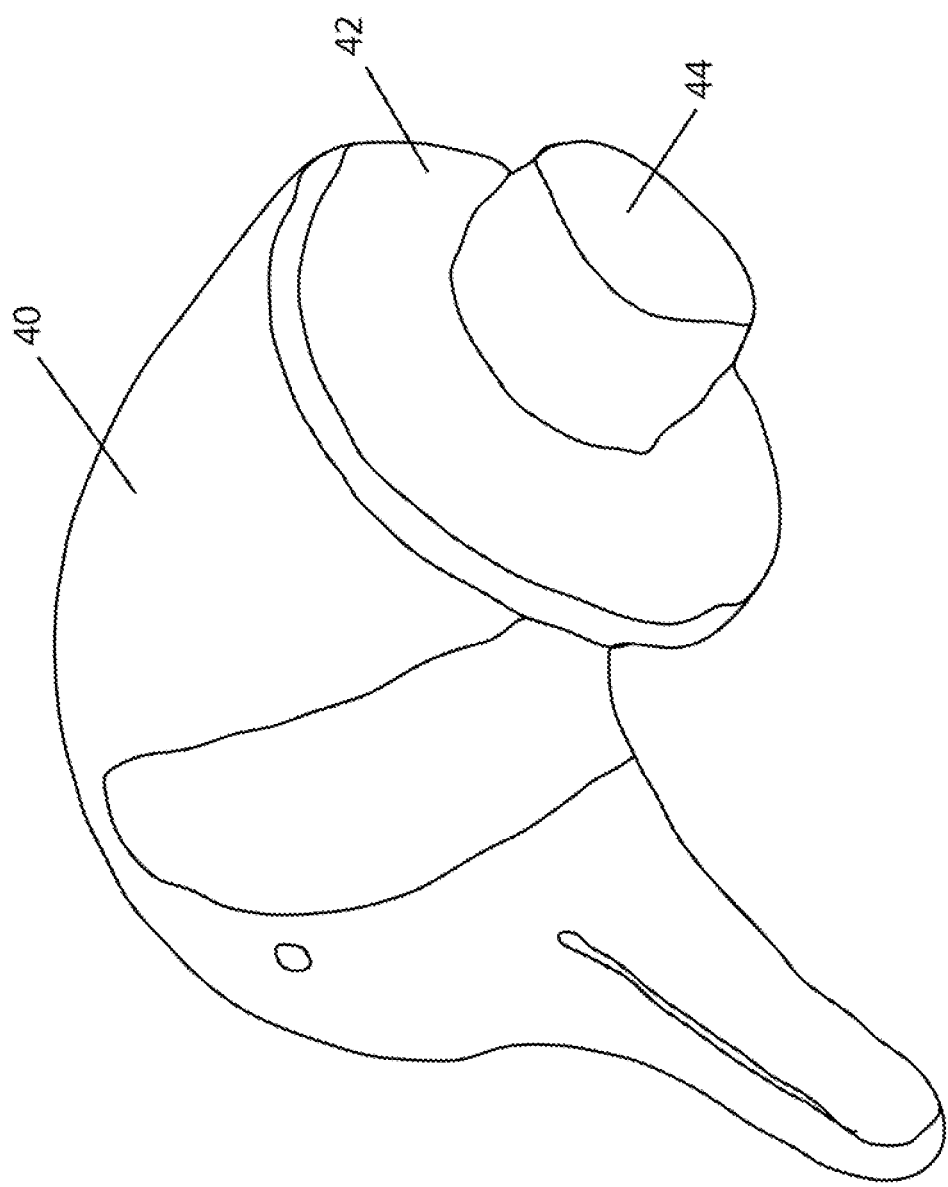
FIG. 3 is a perspective view of a goose decoy head having one half of an interconnect in accordance with an embodiment of the invention.

Turning attention now to the Figures, embodiments of the apparatus 10 for interconnecting the body and extremity of a decoy in accordance with the present invention will now be described in more detail. Decoys having an interconnect 10 of the present invention that interconnect the head and body of a waterfowl decoy are generally shown in FIGS. 1-4. Those familiar with the art will appreciate that the head and body styles vary significantly between decoys that float on the water (floaters) and decoys that are spread out on land (field decoys). By way of example, floater decoys often have the head aligned further back on the body to simulate a resting or sleeping waterfowl. In contrast, the field decoy will often have the head stretched out or extending downward to simulate natural behavior of waterfowl in a field. FIG. 1 illustrates a field decoy body 20 having an interconnect or interlock 10 that interlocks the body 20 with interconnecting feet 22 and an interconnecting head 24. Similarly, FIG. 2 shows a floater decoy having a body portion 30 interconnected with interlock 10 to the head 34.

Figure 4:
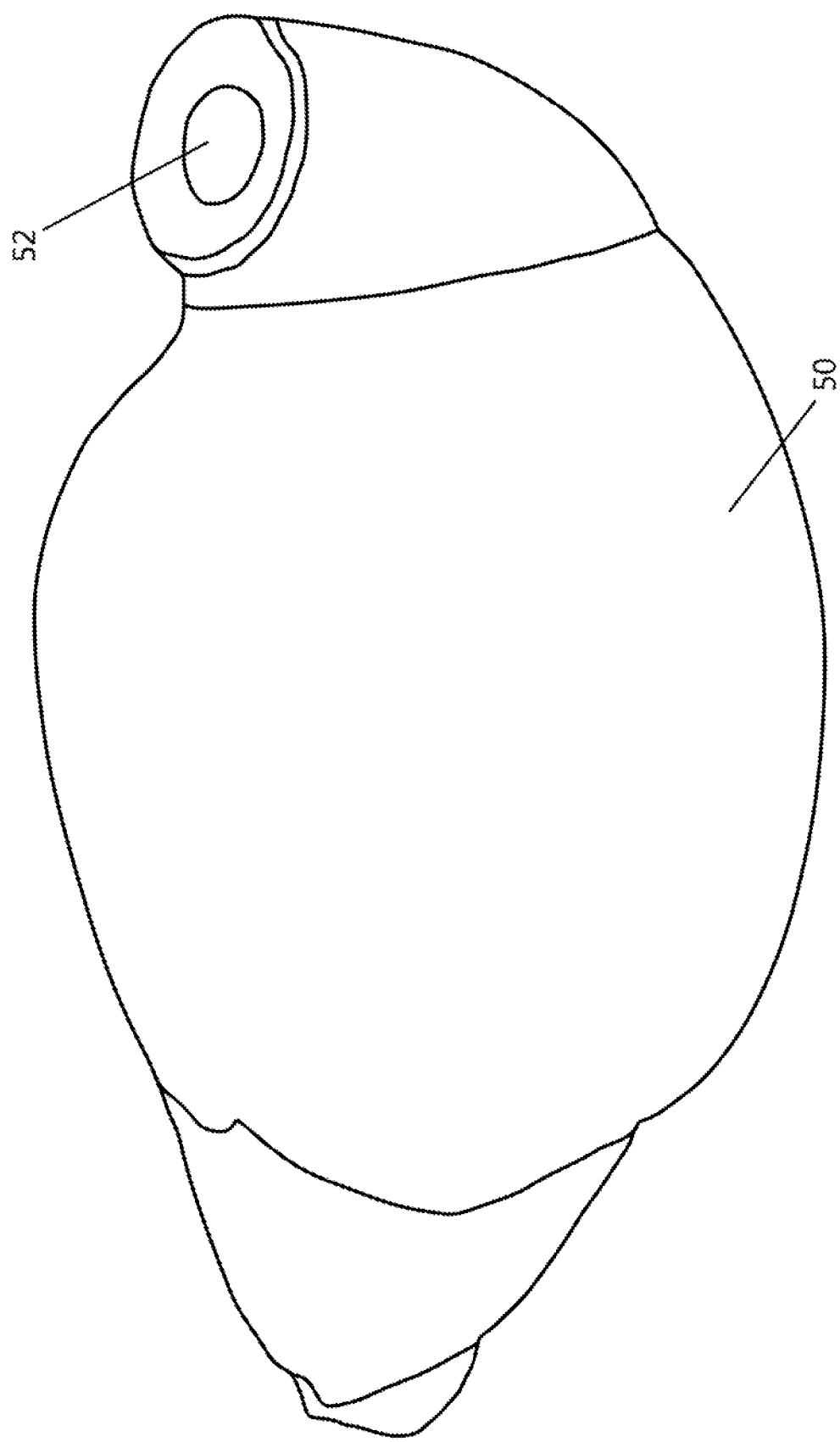
FIG. 4 is a perspective view of a goose decoy body having one half of an interconnect in accordance with an embodiment of the invention.
Figure 5:
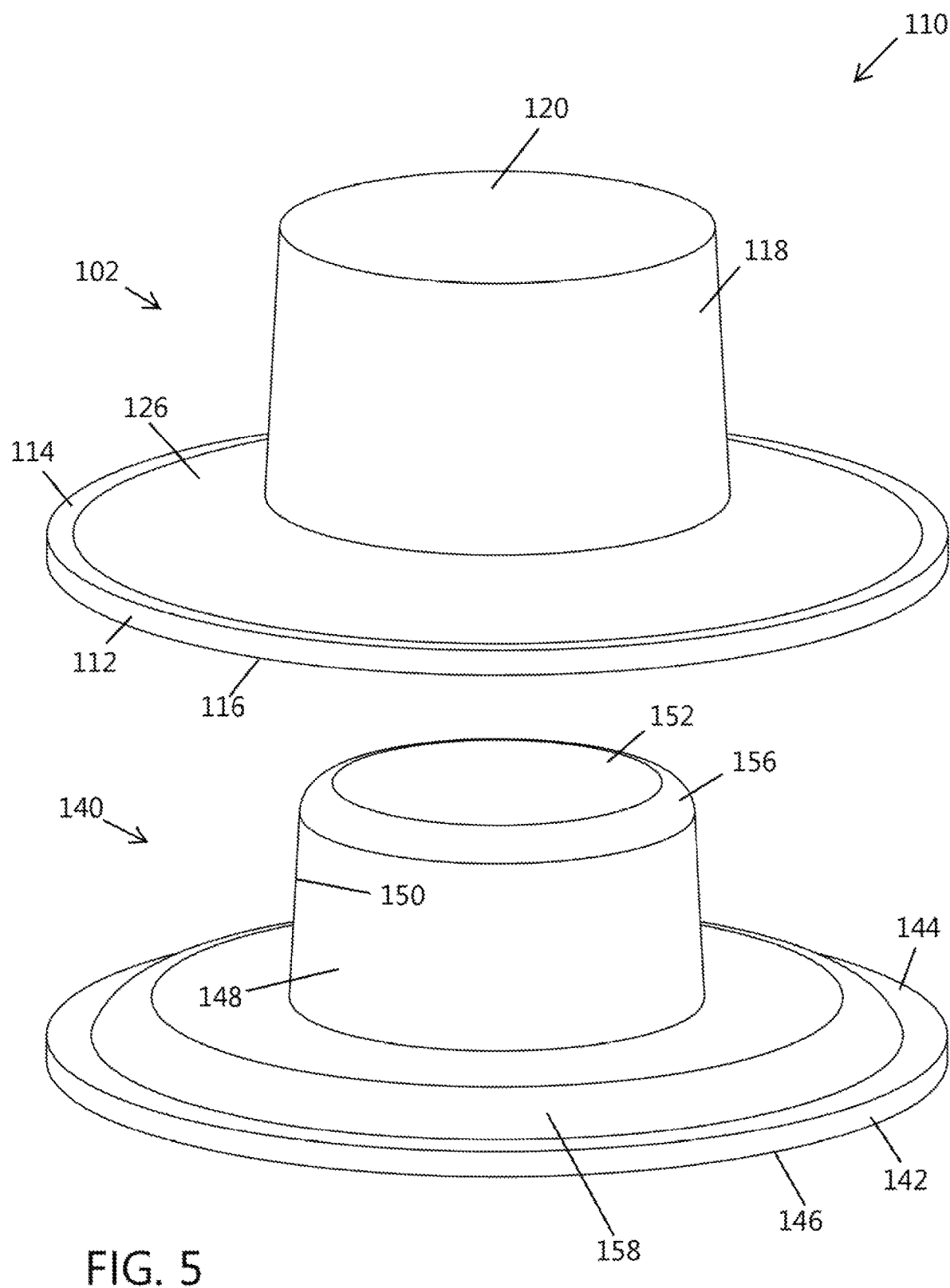
FIG. 5 is a top perspective view of an interconnect in accordance with an embodiment of the invention.
Figure 6:
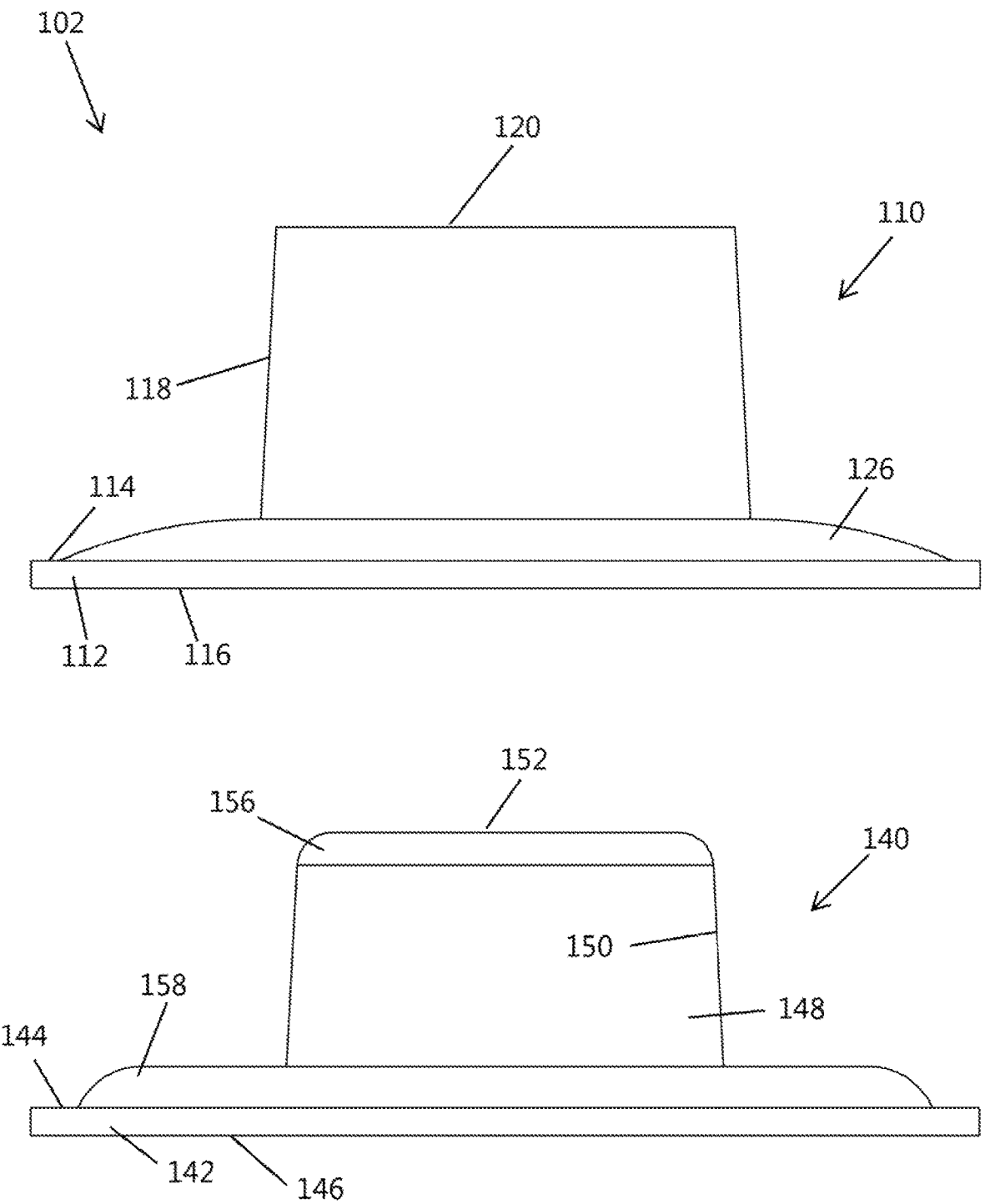
FIG. 6 is a side view of the interconnect of the type shown in FIG. 5.
Figure 7:
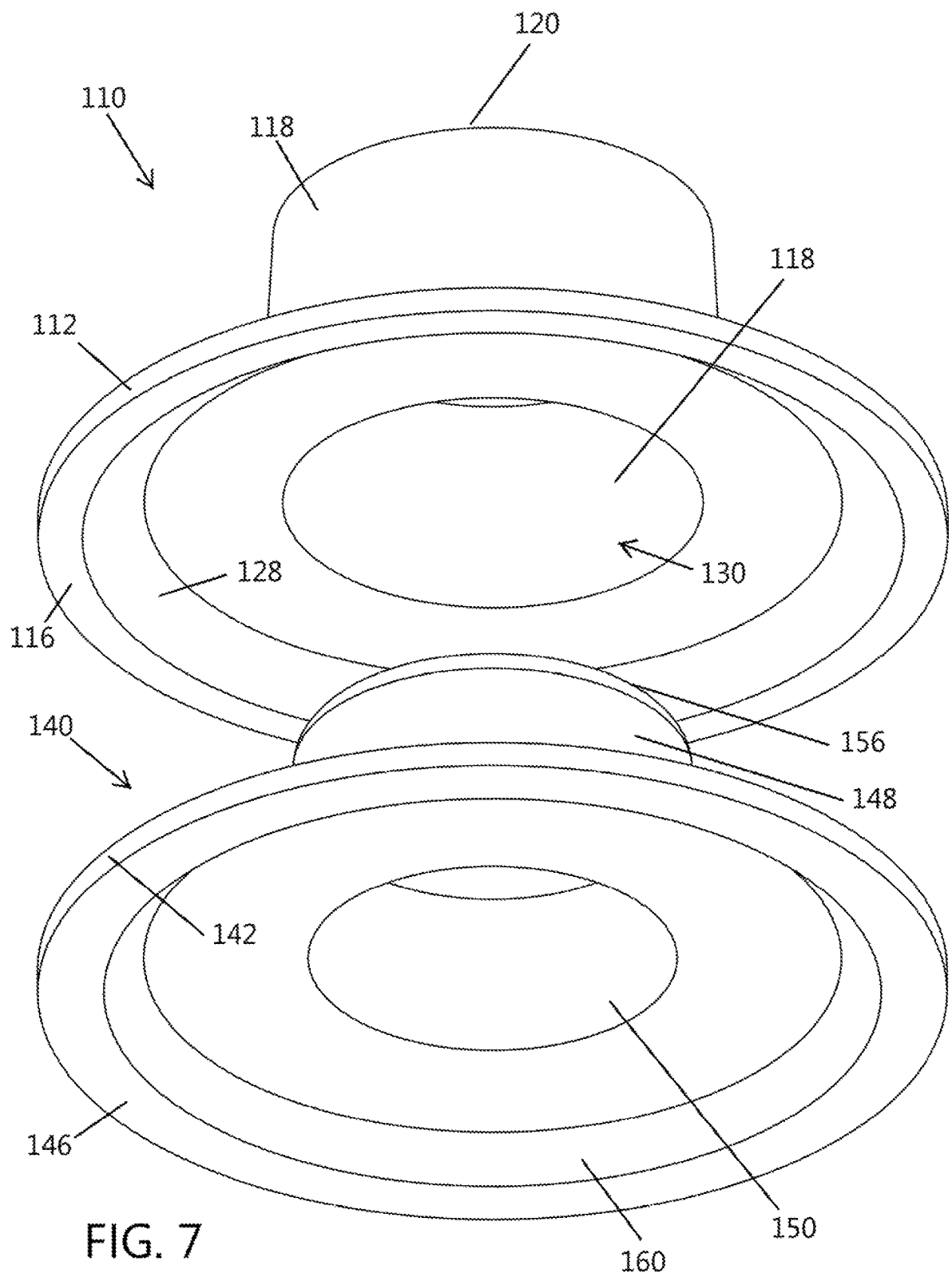
FIG. 7 is a bottom perspective view of an interconnect of the type shown in FIG. 5.
Figure 8:
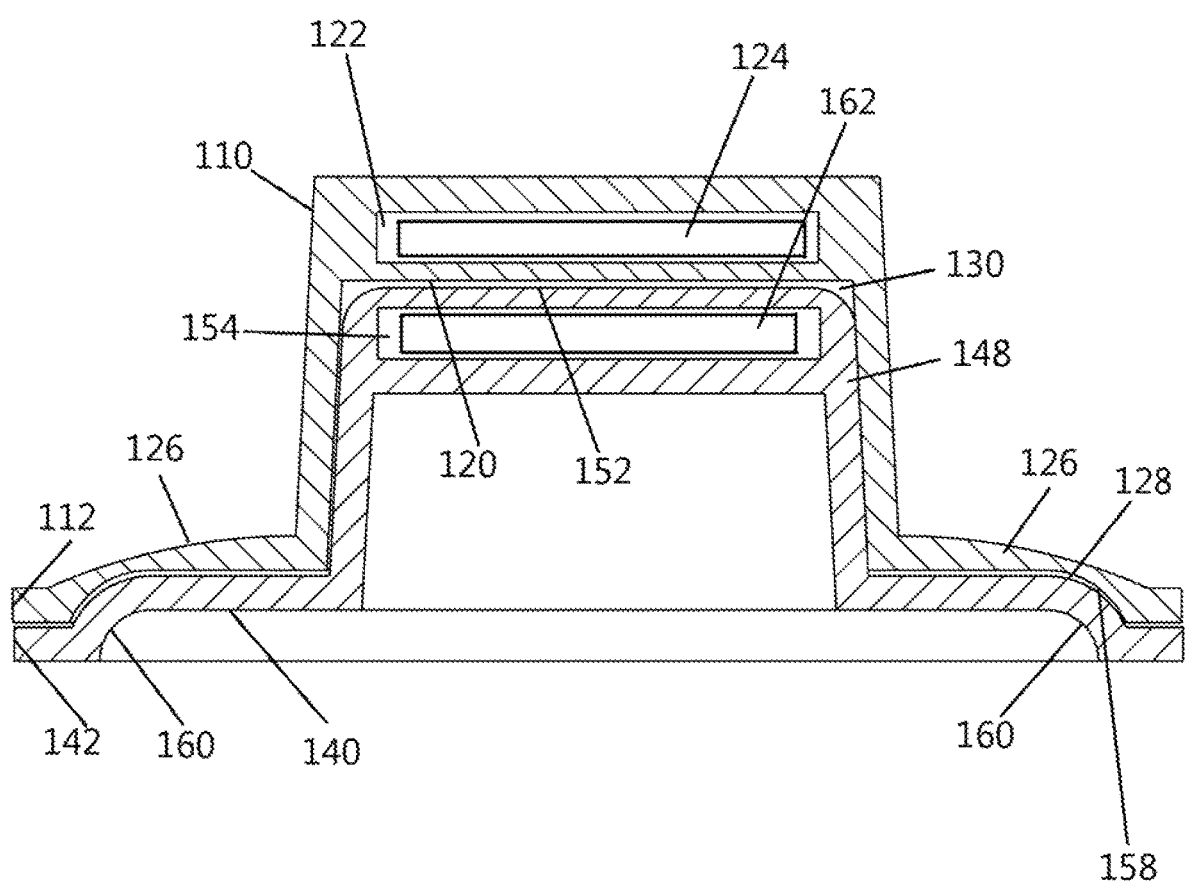
FIG. 8 is a partial sectional perspective view of an interconnect in accordance with an embodiment of the invention.
Figure 9:
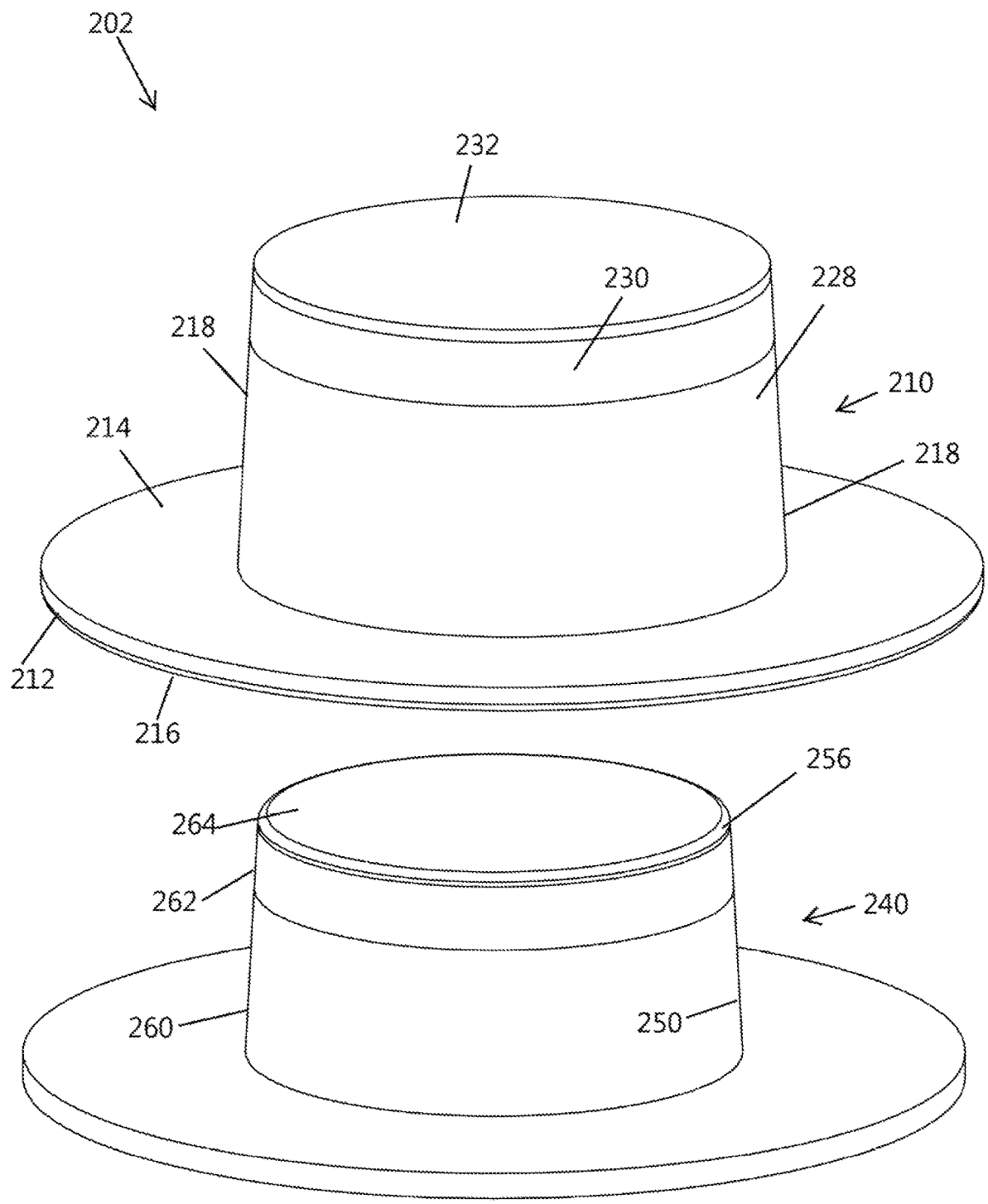
FIG. 9 is a top perspective view of an interconnect in accordance with an embodiment of the present invention.
Figure 10:
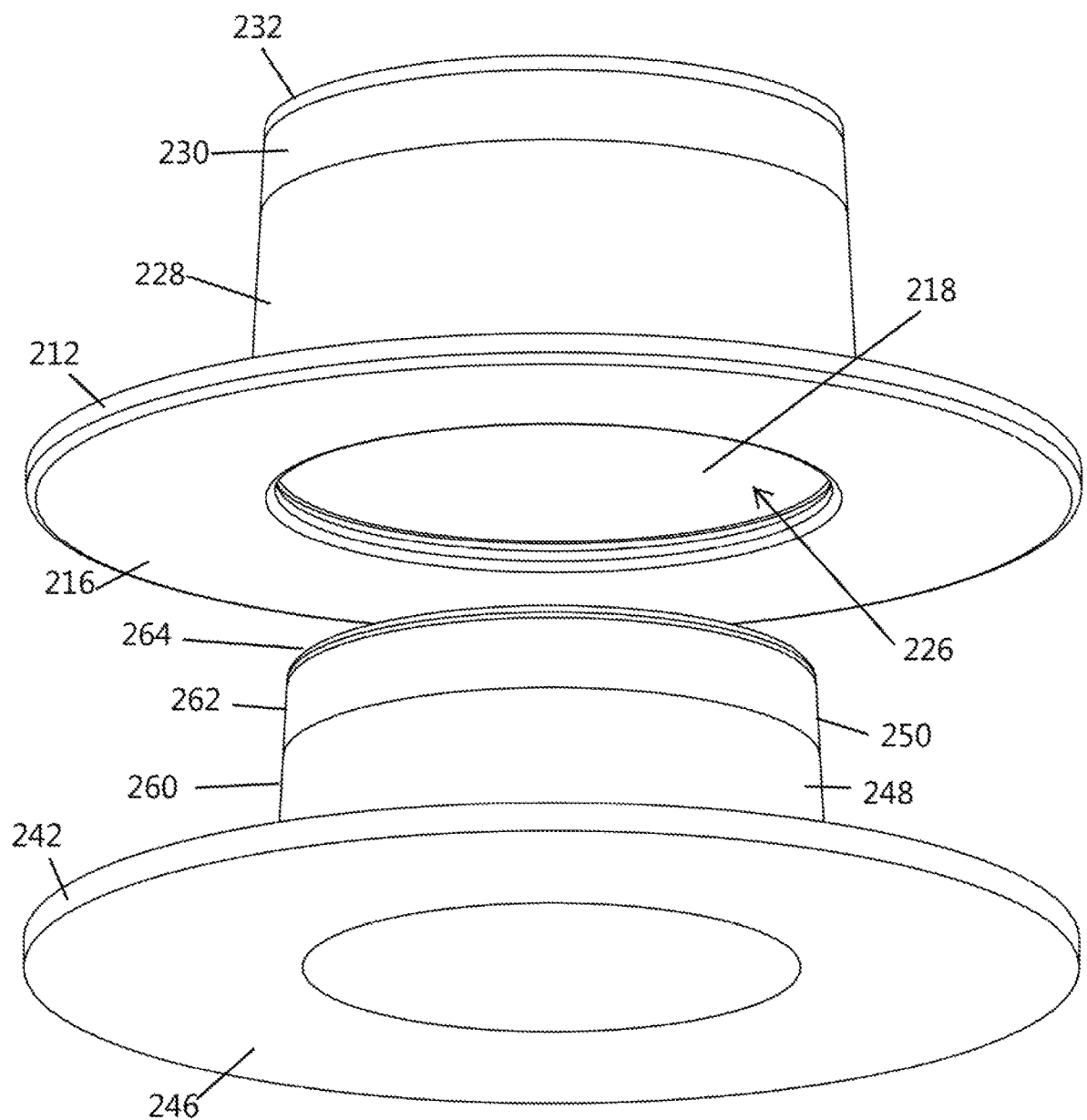
FIG. 10 is a bottom perspective view of an interconnect in accordance with an embodiment of the present invention.
Figure 11:
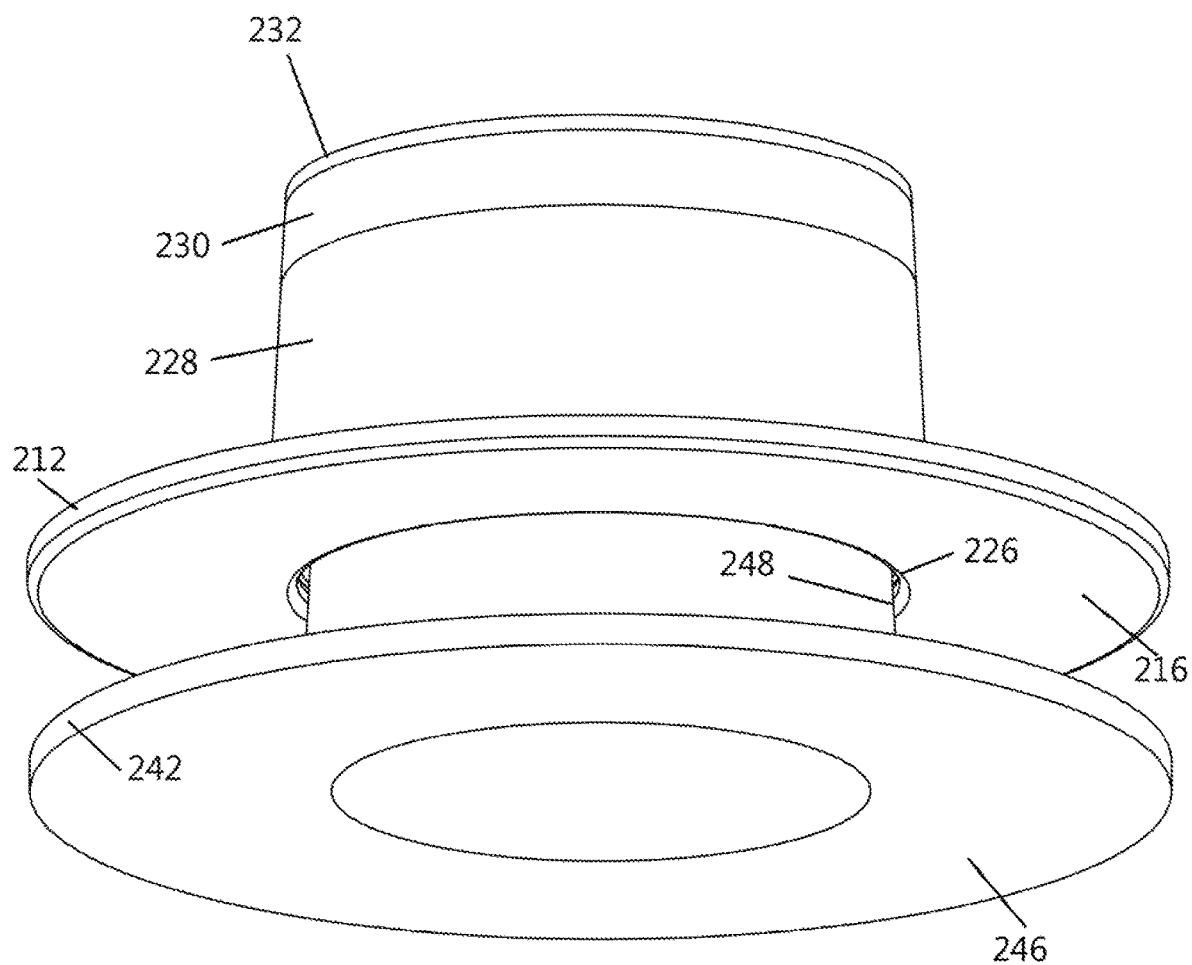
FIG. 11 is a bottom perspective view of an interconnect in accordance with an embodiment of the present invention.
Figure 12:
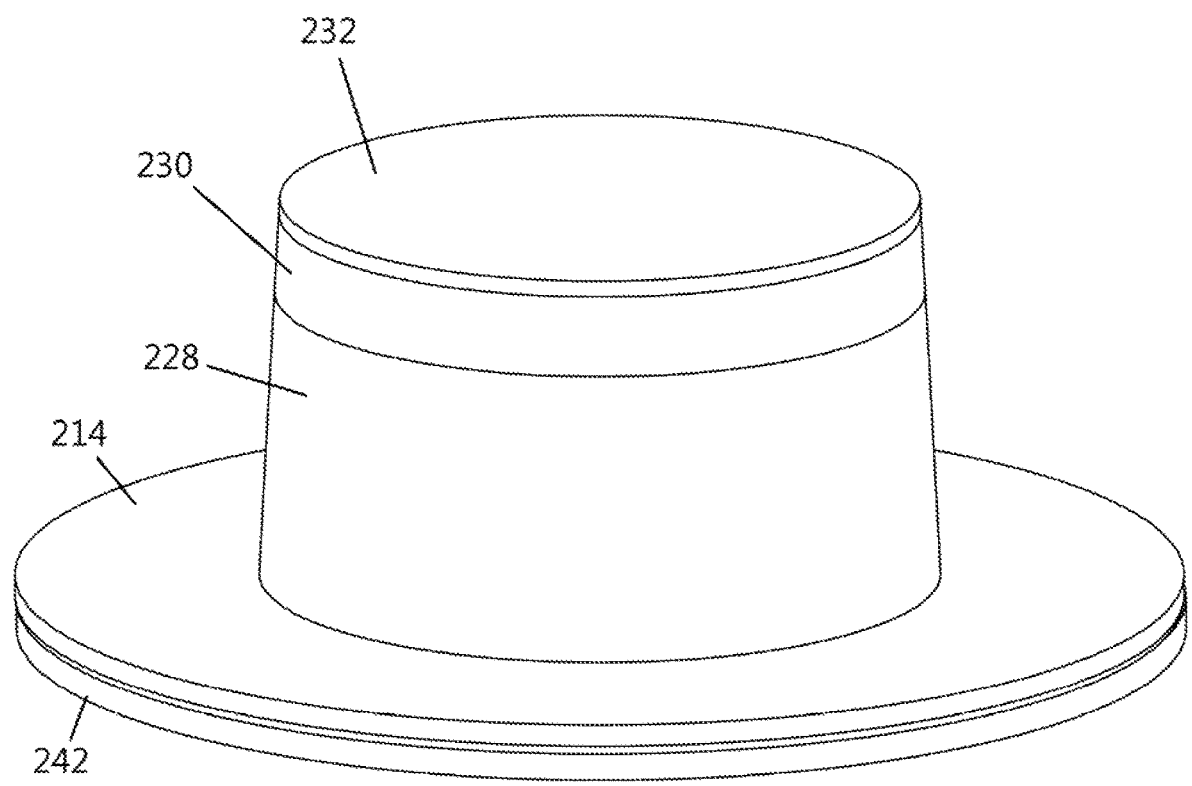
FIG. 12 is a top perspective view of an interconnect in accordance with an embodiment of the present invention.
Figure 13:
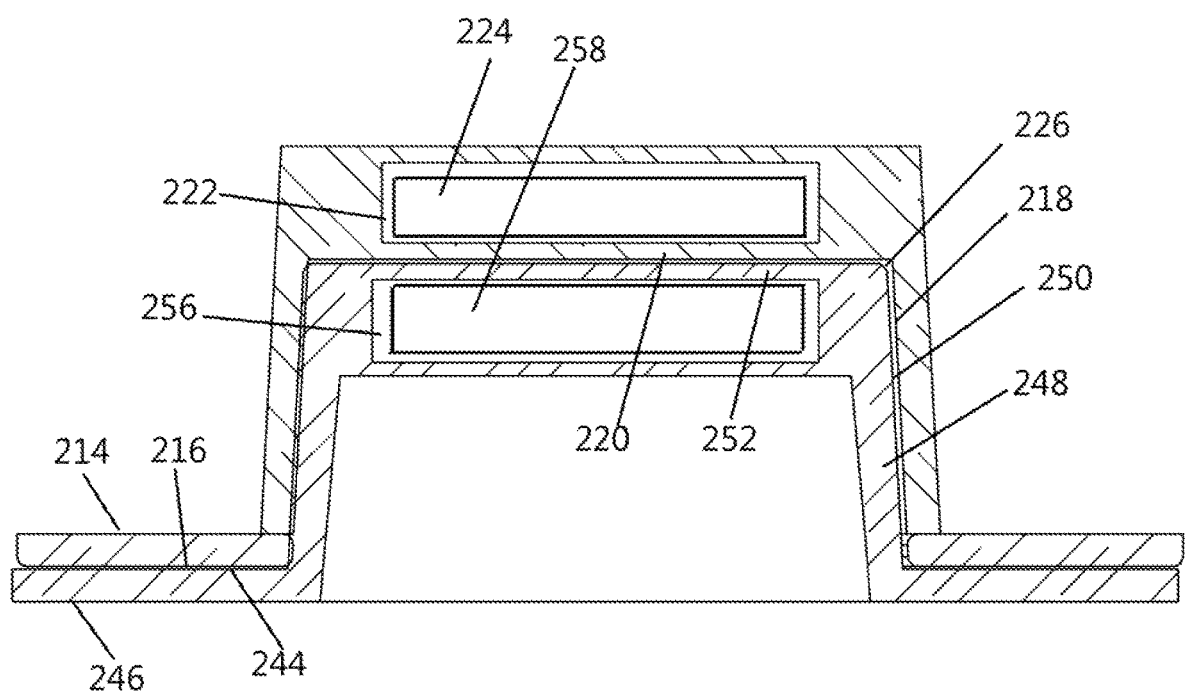
FIG. 13 is a partial sectional perspective view of the interconnect of the type shown in FIG. 12.
Figure 14:
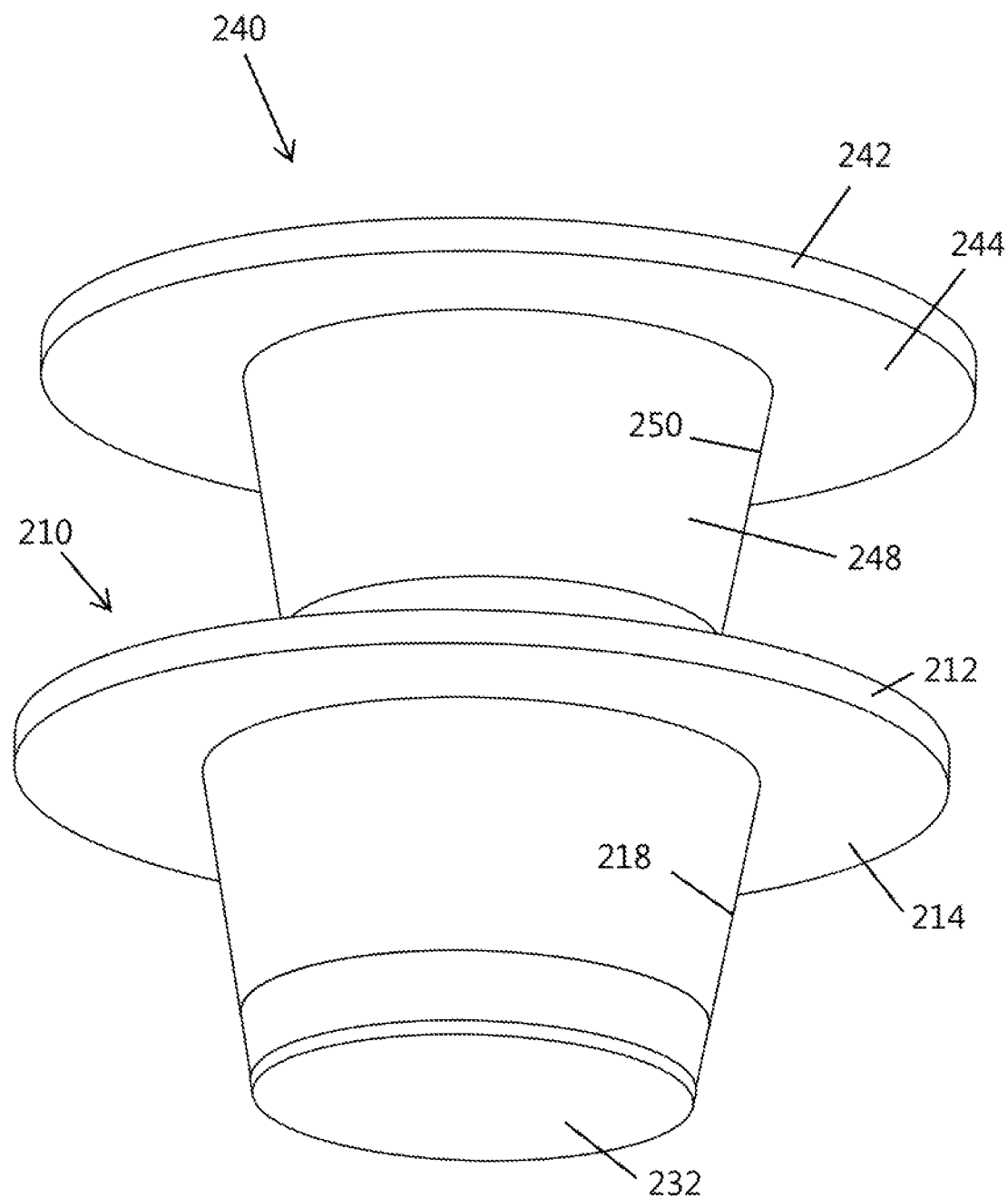
FIG. 14 is a top perspective view of an interconnect in accordance with an embodiment of the invention.
Figure 15:
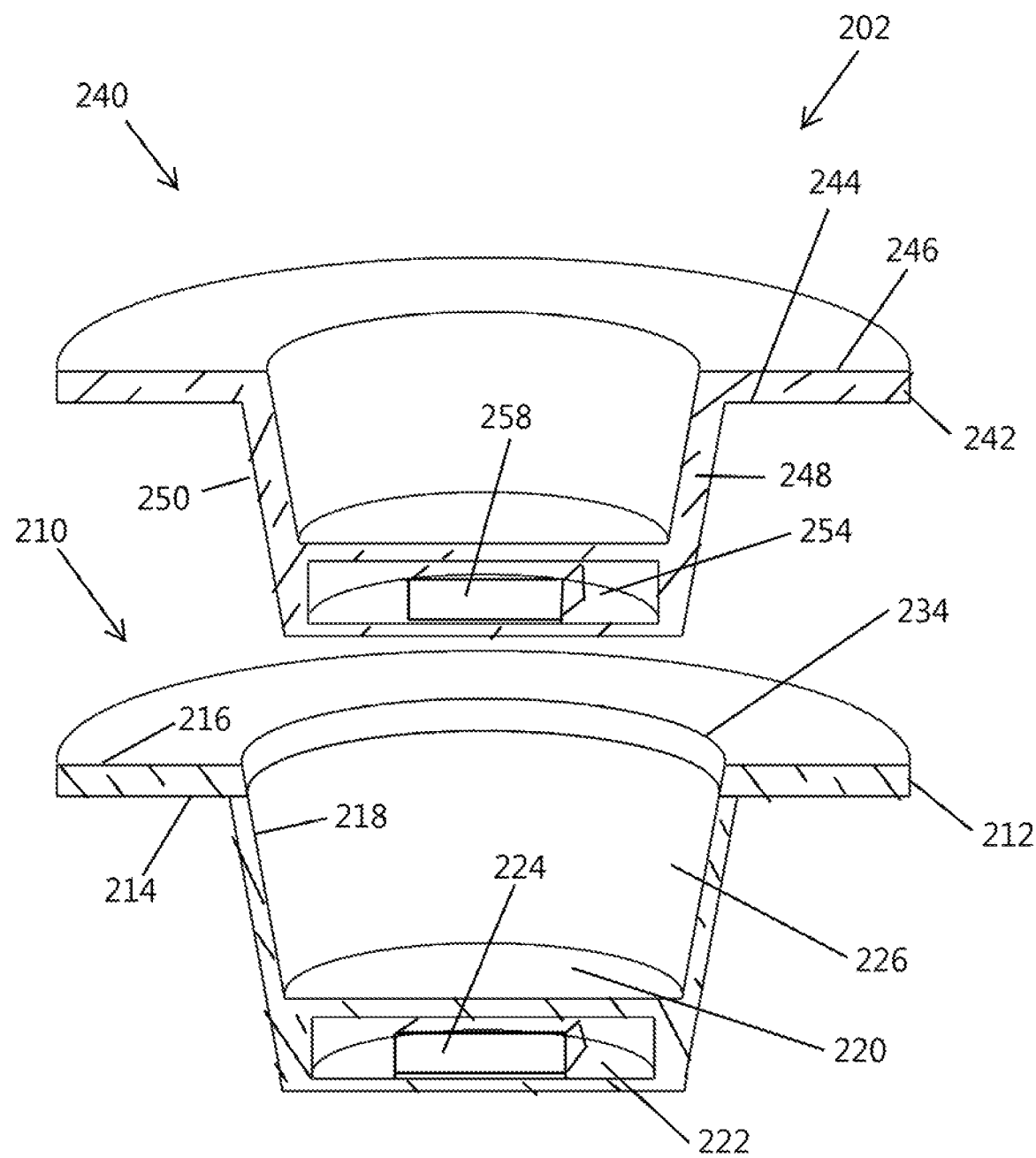
FIG. 15 is a partial sectional perspective view of an interconnect of the type shown in FIG. 14.
Figure 16:
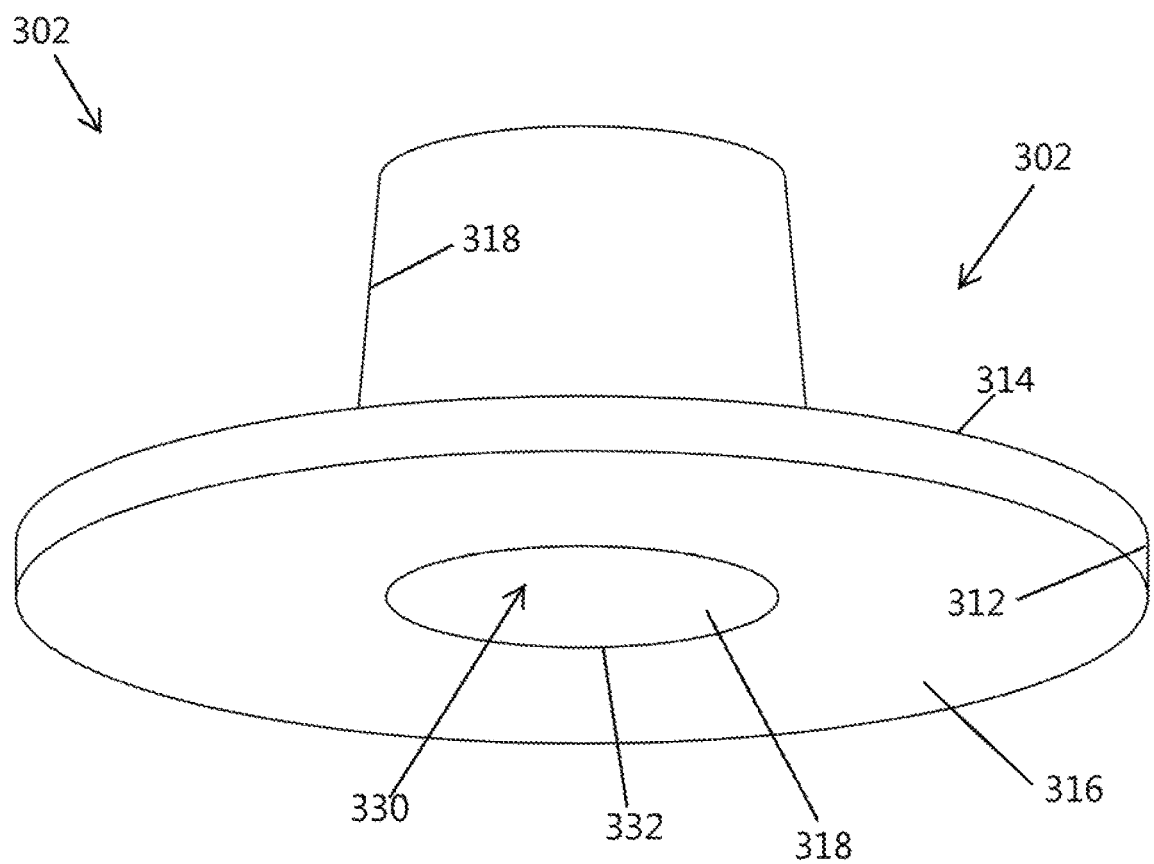
FIG. 16 is a bottom perspective view of an interconnect in accordance with an embodiment of the invention.
Figure 16:
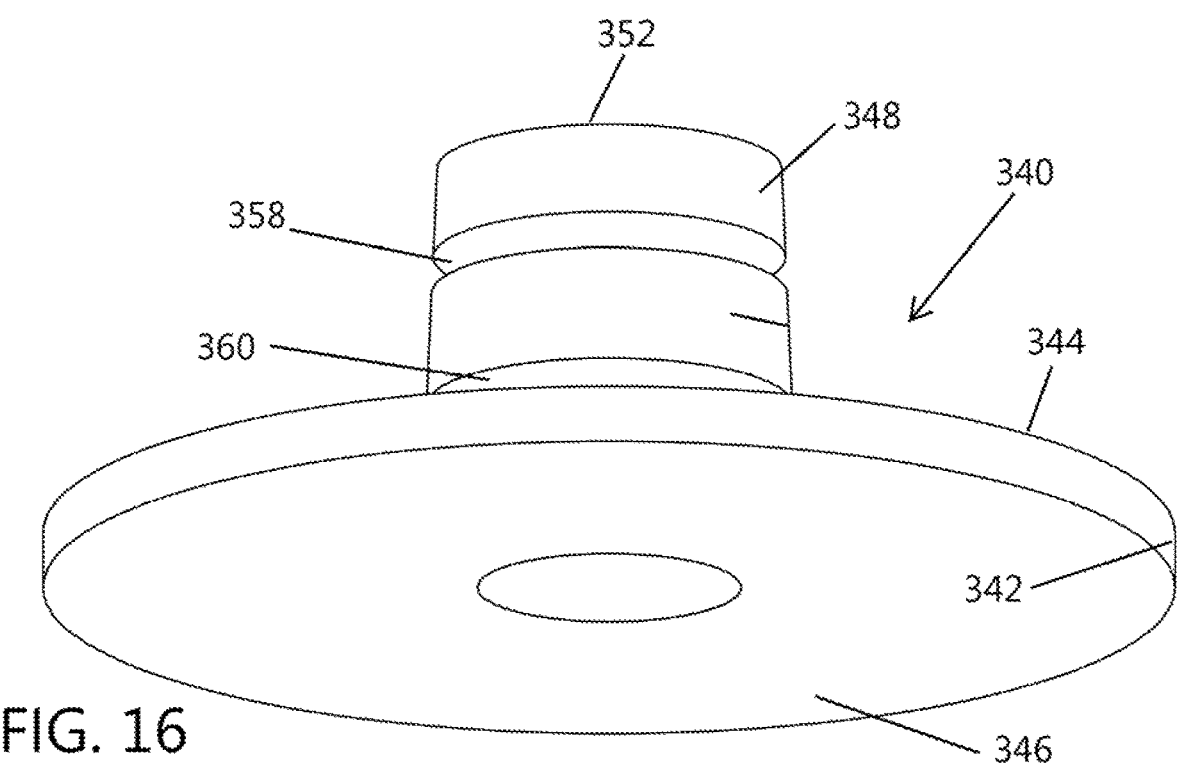
Figure 17:
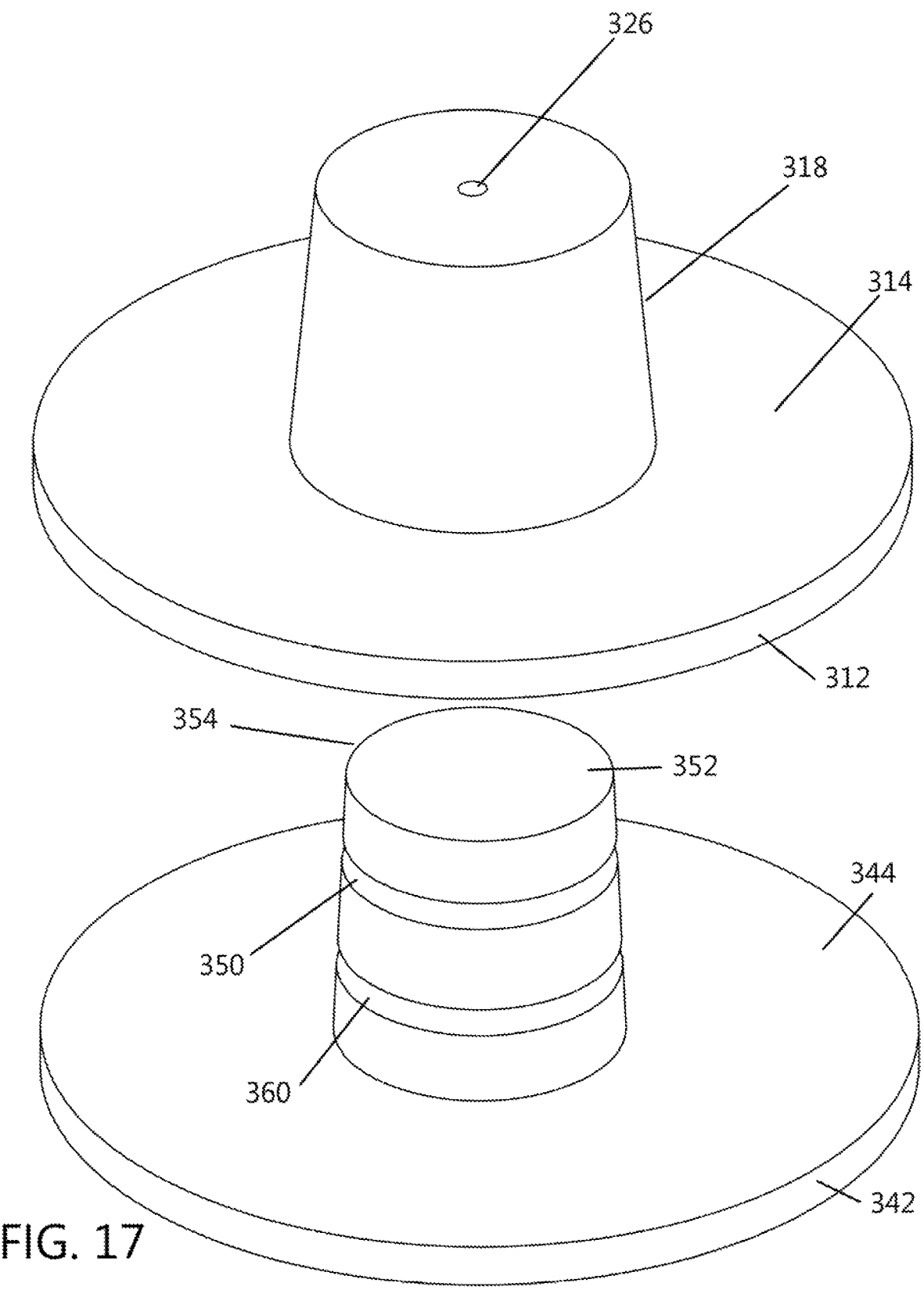
FIG. 17 is a top perspective view of an interconnect in accordance with an embodiment of the invention.
Figure 18:
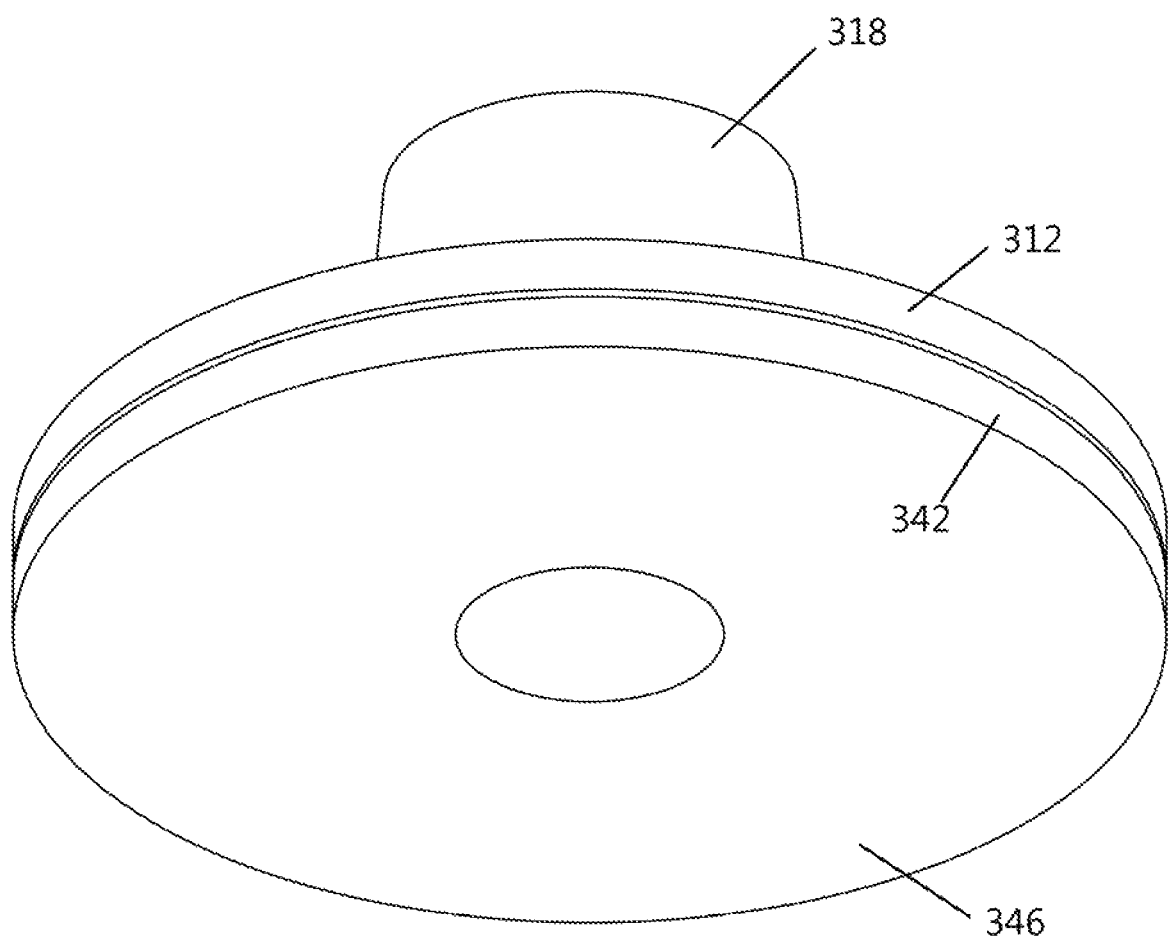
FIG. 18 is a bottom perspective view of an interconnect in accordance with an embodiment of the invention.
Figure 19:
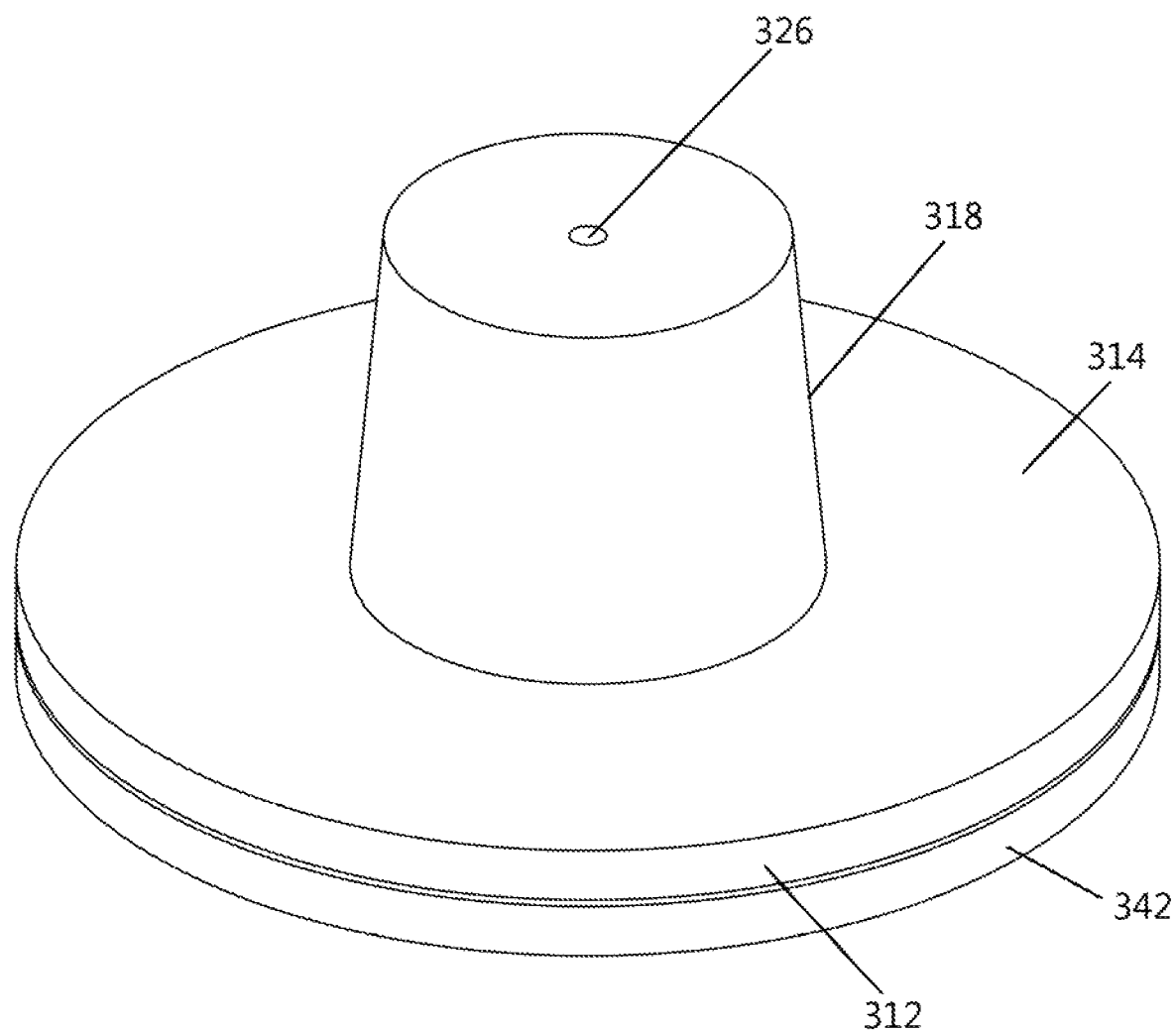
FIG. 19 is a top perspective view of an interconnect in accordance with an embodiment of the present invention.

FIG. 4 shows a retrofit decoy head 40 having rim 42 adhered to the head 40 and having protrusion 44 extending from rim 42. The protrusion 44 includes a tapered sidewall and is sized to snuggly fit within the receptacle 52 of the decoy body 50. Those skilled in the art will appreciate that the interconnect 10 of the present invention may include a rim that is sized and shaped to match the many shapes and styles of heads 40 and bodies 50 to allow sufficient adherence of the interconnect 10 to the head or body.

FIGS. 5-8 show generally an exemplary interlock 102 having contoured rims. The interlock 102 includes a first interconnect 110 having a receptacle 130. The first interconnect 110 has a rim 112 extending outwardly from the receptacle 130. The rim 112 has top 114 and bottom 116 sides that include respectively contoured surfaces 126 and 128. The receptacle 130 includes a tapered sidewall 118 that terminates at bottom 120. The bottom has a cavity 122 formed within the bottom which is sized to receive a magnet 124. The magnets utilized with the present invention are preferably neodymium magnets having an estimated pull force between 15-30 lbs. The magnets are preferably disc-shaped having sizes ranging between 1-1.5 inch diameter and a thickness between 0.10-0.375 inches thick. Of course, other magnets having different shapes and sizes may be utilized without departing from the scope of the invention. The magnetic field or flux lines of magnet 124 preferably align with the rim 112. Similarly, the interlock 102 has a second interconnect 140 having a protrusion 148 that mates with receptacle 130 of the first interconnect 110. The second interconnect 140 has a rim 142 extending outwardly from the protrusion 148. The rim 142 has top 144 and bottom 146 sides that include respectively contoured surfaces 158 and 160. The protrusion 148 includes a tapered sidewall 150 that terminates at bottom 152. The bottom 152 has a cavity 154 formed within the bottom which is sized to receive a magnet 162. The outer bottom portion 152 of the protrusion 150 may be rounded or chamfered 156 such that insertion into the receptacle 130 is facilitated. The first and second interlocks 110 and 140 may be thermo molded, printed, rotary molded, blow molded or formed with other known techniques having the magnet of each interconnect enclosed or encompassed with each enclosed corresponding cavity.

With reference to FIGS. 9-15, an exemplary interlock 202 of an embodiment of the invention is illustrated having parallel rims. The interlock 202 includes a first interconnect 210 having a receptacle 226. The first interconnect 210 has a rim 212 extending outwardly from the receptacle 226. The rim 212 has top 214 and bottom 216 sides that include respectively flat or parallel surfaces. The receptacle 226 includes an opening 234 and tapered sidewall 218 that terminates at bottom 220. The bottom has a cavity 222 formed within the bottom which is sized to receive a magnet 224. Similarly, the interlock 202 has a second interconnect 240 having a protrusion 248 that mates with receptacle 226 of the first interconnect 210. The second interconnect 240 has a rim 242 extending outwardly from the protrusion 248. The rim 242 has top 244 and bottom 246 sides that extend outward and are parallel. The protrusion 248 includes a tapered sidewall 250 that terminates at bottom 252. The bottom 252 has a cavity 254 formed within the bottom which is sized to receive a magnet 258. The outer bottom portion 252 of the protrusion 248 may be rounded or chamfered 256 such that insertion into the receptacle 226 is facilitated. The first and second interlocks 210 and 240 may be formed or segmented in corresponding first segments 228 and 260, middle segments 230 and 262 and outer or top segments 232 and 264. The tapered sidewall may have a draft angle of between 1-10 degrees, however, a 3 degree draft has been found to be well suited with the invention.

The multidimensional tapered surface together with the magnet attraction between the magnets of the mating interconnects provide a sufficient binding so that the head does not disengage from the decoy body when the head is used to carry the decoy. However, at the same time, a pulling force on the directly outward so that the tapered sidewalls do not engage each other results in a quick and easy way to remove the head from the body. Of course, one of the magnets may be replaced with a material that is attracted to the opposing magnet, however using two magnets has been found desirable.

As shown in FIGS. 16-19 another alternate embodiment of the invention is illustrated. FIGS. 16-19 shows generally an exemplary interlock 302 that utilizes o-rings or gaskets rather than magnets to provide a restricting force between the first and second interconnects 310 and 340. The interlock 302 includes a first interconnect 310 having a receptacle 330. The first interconnect 310 has a rim 312 extending outwardly from the receptacle 330. The rim 312 has top 314 and bottom 316 sides that include respectively flat or parallel surfaces. The receptacle 330 includes an opening 332 and tapered sidewall 318 that terminates at bottom 320. Similarly, the interlock 302 has a second interconnect 340 having a protrusion 348 that mates with receptacle 330 of the first interconnect 310. The second interconnect 340 has a rim 342 extending outwardly from the protrusion 348. The rim 342 has top 344 and bottom 346 sides that extend outward and are parallel. The protrusion 348 includes a tapered sidewall 350 that terminates at bottom 352. The tapered sidewall 350 includes annular grooves 358 and 360 that are adapted for receiving an o-ring or gasket. The outer bottom portion 352 of the protrusion 348 may be rounded or chamfered 354 such that insertion into the receptacle 330 is facilitated. The first interconnect 310 includes an aperture or hole 326 extending through the bottom 320 to allow air to escape as the first interconnect 310 is press fit into the second interconnect 340.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A waterfowl decoy for attracting waterfowl, the decoy comprising:
   a body having a non-ferromagnetic plastic receptacle, the non-ferromagnetic plastic receptacle having an open end, inward tapered side walls extending into the body from the open end, and terminating at an enclosed bottom portion within the body; the side walls having a first diameter adjacent the open end that is greater than a second diameter adjacent the enclosed bottom portion; and wherein the enclosed bottom portion includes a first magnet embedded in the enclosed bottom portion;
   a removable head having a non-ferromagnetic plastic base portion that interconnects with the body, the non-ferromagnetic plastic base portion including an outwardly extending tapered projection terminating in an enclosed end; the tapered projection sized to fit within the non-ferromagnetic receptacle of the body; and the enclosed end including a second magnet embedded in the enclosed end.

2. The waterfowl decoy as recited in claim 1, wherein a hollow enclosed cavity is formed within the bottom portion of the non-ferromagnetic plastic receptacle.

3. The waterfowl decoy as recited in claim 1, further including a cavity formed in the bottom portion of the non-ferromagnetic plastic receptacle, wherein the first magnet is isolated within the cavity.

4. The waterfowl decoy as recited in claim 1, further including a cavity formed in the enclosed end of the non-ferromagnetic plastic base portion, wherein the second magnet is isolated within the cavity.

5. The waterfowl decoy as recited in claim 1, wherein the removable head is a waterfowl decoy head.

6. A decoy for attracting animals having an interlock apparatus for connecting the body and removable extremity portions, the decoy comprising:
   a decoy body made with a material selected from the group consisting of a durable polymer and rubber;
   a decoy extremity made with a material selected from the group consisting of a durable polymer and rubber;
   an interlock made with a material selected from the group consisting of a durable polymer and rubber, the interlock having a first half associated with the decoy body and a second half associated with the decoy extremity, the first half of the interlock forming a receptacle within the decoy body, the receptacle of the first half of the interlock having an open end, inward tapered side walls extending into the decoy body from the open end, and terminating at a bottom portion within the decoy body; the side walls having a first diameter adjacent the open end that is greater than a second diameter adjacent the bottom portion, wherein the bottom portion of the first half of the interlock includes a first magnet contained by the bottom portion, the second half of the interlock having a tapered projection extending outwardly from the decoy extremity and terminating in an end, wherein the end includes a second magnet contained by the end and whereby the tapered projection is sized to fit within the receptacle of the first half of the interlock.

7. The decoy as recited in claim 6, wherein an enclosed cavity is formed within the bottom portion of the receptacle of the first half of the interlock and wherein the first magnet is contained within the enclosed cavity.

8. The decoy as recited in claim 6, further including an enclosed cavity formed in the end of the tapered projection of the second half of the interlock and wherein the second magnet is contained within the enclosed cavity.

9. The apparatus as recited in claim 6, wherein the decoy extremity is a waterfowl decoy head.

10. A decoy for attracting animals having a removable coupling to interconnect a body and removable extremity portions of the decoy, the decoy comprising:
    a decoy body;
    a decoy extremity;
    a first removeable connector adapted for coupling to the decoy body or decoy extremity, the first removeable connector having a receptacle, the receptacle having an open end, inward tapered side walls extending into the first removeable connector from the open end, and terminating at a bottom portion within the first connector; the side walls having a first diameter adjacent the open end that is greater than a second diameter adjacent the bottom portion;
    a second removeable connector adapted for coupling to the decoy body or decoy extremity, the second removeable connector having a base portion that interconnects with the first connector, the base portion including an outwardly extending tapered projection terminating in an end whereby the tapered projection is sized to fit within the receptacle of the removeable first connector; and
    wherein at least one of the bottom portion of the receptacle and the end of the projection includes a magnet contained thereby and wherein the other one of the bottom portion of the receptacle and the end of the projection includes a member contained thereby that attracts to the magnet.

11. The decoy as recited in claim 10, wherein the first removeable connector includes a rim extending outwardly from the receptacle wherein the rim is attachable to at least one of the decoy body and decoy extremity.

12. The decoy as recited in claim 11, wherein the rim is profiled to match the contour of at least one of the decoy body and the decoy extremity.

13. The decoy as recited in claim 10, wherein the second removeable connector includes a rim extending outwardly from the base portion wherein the rim is attachable to at least one of the decoy body and decoy extremity.

14. The decoy as recited in claim 13, wherein the rim is profiled to match the contour of at least one of the decoy body and the decoy extremity.

15. The decoy as recited in claim 10, wherein the magnet is embedded in one of the bottom portion of the receptacle and the end of the projection.

16. The apparatus as recited in claim 10, wherein the member has ferromagnetic properties.

17. The apparatus as recited in claim 10, wherein an enclosed cavity is formed within the bottom portion of the receptacle.

18. The apparatus as recited in claim 17, wherein the member has ferromagnetic properties.

19. The apparatus as recited in claim 10, further including a cavity formed in the end of the base portion, wherein the cavity is adapted to receive at least one of the magnet and member.

20. The apparatus as recited in claim 10, wherein the removable extremity is a waterfowl decoy head.

\* \* \* \* \*